United States Patent Office 2,999,116
Patented Sept. 5, 1961

---

2,999,116
PROCESS FOR PREPARING PATCHOULIONE
Habib Emile Eschinazi, Montclair, N.J., assignor to The Givaudan Corporation, New York, N.Y., a corporation of New Jersey
No Drawing. Filed June 11, 1958, Ser. No. 741,218
3 Claims. (Cl. 260—587)

This invention relates to an improved process for preparing patchoulione.

Patchoulione may be represented by the following chemical structure:

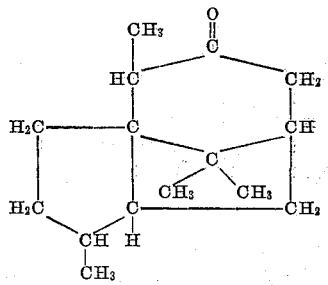

It is a novel ketone having a melting point of 47°–47.5° C. and has a powerful and striking ambergris note. In appearance, patchoulione is a white, waxy crystalline solid. Its empirical formula is $C_{15}H_{24}O$; its 2,4-dinitrophenylhydrazone, $C_{21}H_{28}N_4O_4$, melts at 187.5°–188.5° C. and on equilibration in $D_2O$ patchoulione is converted to a trideuteroketone.

Patchoulione may be prepared from the oxygenated derivatives of a mixture of patchoulenes derived from patchouly alcohol. As so prepared, the unusual perfume value of the patchoulione is impaired on account of isomeric impurities, such as those derived from oxygenated derivatives of γ-patchoulene or isomeric alcohols with camphoraceous notes. While such impurities may be removed, lengthy and costly fractional distillation and chromatographic procedures are required. Furthermore, the recovery of patchoulione is not complete and this is reflected in the unsatisfactory yield of this ketone.

The isolation of pure β-patchoulene oxide from the mixture of patchoulene oxides is difficult, and, in some cases, practically impossible. Consequently, as a practical matter, it is seen that the indicated method of making patchoulione from patchoulene oxide is economically and technically unsatisfactory.

In accordance with this invention, I have found a technically-simple and commercially-feasible process for making patchoulione in excellent yields. My process, in general, involves the treatment of trans-β-patchoulanediol with strong acid, preferably at elevated temperatures. Substantially theoretical yields of the desired patchoulione of excellent purity are obtained.

The reaction may be represented as follows:

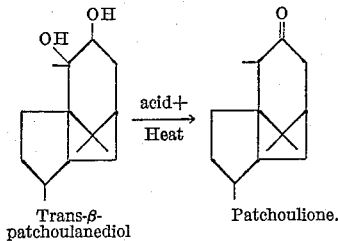

Trans-β-patchoulanediol → Patchoulione.

The trans-β-patchoulanediol is prepared by treating β-patchoulene or a mixture of β- and γ-patchoulenes containing at least about 30%, by weight, of β-patchoulene with an hydroxylation agent, in the presence of water and a strong acid catalyst at an elevated temperature.

In conducting the novel process of this invention, it has been found that strong acids, such as p-toluene sulfonic acid, sulfuric acid, phosphoric acid, or mineral acids in general, are required. A weak acid catalyst, such as boron trifluoride, is inoperable for the purposes of my process.

While the use of inert solvents in the reaction medium is not necessary, it is preferred to use them, on practical grounds. Usable solvents are those which are water-immiscible, preferably having a boiling range within the range from about 50°–100° C., so they may distill off with the water of reaction, be separated easily therefrom and returned to the reaction vessel. A wide variety of solvents may be employed, examples being aliphatic, cycloaliphatic, and aromatic hydrocarbons, e.g., pentanes, hexanes, cyclohexanes and benzene, as well as their low boiling (around 80°–110° C.) homologs. In addition, halogenated hydrocarbons, e.g., chloroform, carbon tetrachloride and chloroethylene may be cited as operable solvents. If desired, the solvents may be employed in admixture.

The proportions of the reactants and solvents used in the present process may be varied over wide limits. On the basis of 100 g. of trans-β-patchoulanediol, an amount of acid catalyst from about 0.25 to 10 g. may be used and an amount of solvent as high as 4000 g., or even higher, may be used, if desired. Practical considerations, however, dictate the use of much smaller quantities of solvent, 100 to 400 g. or thereabout being preferred. The preferred amount of acid catalyst is from about 0.5 to about 2 g., it again being noted that all of the amounts given in this paragraph are based on the use of 100 g. of the diol.

While the process of converting the diol to the patchoulione may be carried out at room temperature, i.e., around 25° C., it is preferred to operate at elevated temperatures, e.g., up to 150° C., or even higher, if desired. Generally, a temperature between about 70°–80° C. is preferred, the exact temperature employed depending on the boiling point of the solvent.

The invention is illustrated by the following example, without, however, limiting the same to it. All degrees are in degrees centigrade and all parts are in parts by weight, unless otherwise stated.

EXAMPLE

*(a) Preparation of mixture of β- and γ-patchoulenes*

Twenty-four (24) g. of patchouly alcohol dissolved in 400 ml. of pyridine was placed in a 1000 ml. round-bottom flask. To this solution 140 ml. of $POCl_3$ was added at once and the flask equipped with a reflux condenser protected with a drying tube. The reaction mixture was refluxed for 6 hours and then cooled to room temperature. By this time, the reaction mixture had turned to a dark purple color.

Crushed ice was placed in a 10 cm. glass column and the cooled reaction mixture was poured slowly through the column with more ice added as needed to prevent overheating.

The mixture was extracted twice with ether and the ether layer was washed with 10% HCl twice and then with water until neutral. The ether was dried over sodium carbonate overnight, filtered, and the ether removed on a steam bath. Distillation of the product through a Vigreux column gave 21.8 g. of β-γ-patchoulenes (91% yield), colorless liquid, B.P. 53.5°–54.5°/0.14 mm., 141°–142°/17 mm., $[a]_D^{25} = -43.7°$. Infrared spectroscopy indicated that the ratio of β- to γ-patchoulene was about 2 to 1.

*Analysis.*—Calcd. for $C_{15}H_{24}$: C, 88.16; H, 11.84. Found: C, 88.34; H, 11.82.

(b) Preparation of trans-β-patchoulanediol

Twenty-nine (29) g. of the mixture of β-patchoulene and γ-patchoulene, as prepared in accordance with part (a) of this example, 29 ml. of benzene, 16 g. of peracetic acid, 25.6 g. of acetic acid, 0.4 g. of sulfuric acid (100%) and 38 g. of water were placed in a suitable glass reaction vessel and strongly agitated at 30° to 35° C. for 2 to 3 hours. The temperature was then raised to 40° to 45° C. and maintained thereat for 30 minutes.

After neutralization with 120 g. of a 20% aqueous NaOH solution, 13.5 g. of trans-β-patchoulanediol was separated from the reaction mixture by filtration, as white crystals. After re-crystallization from benzene, the trans-β-patchoulanediol was found to have a melting point of 200° C. and on analysis, was found to have a carbon content of 75.39 and a hydrogen content of 11.08. The theoretical carbon and hydrogen contents, based on the formula, $C_{15}H_{26}O_2$ are 75.58 and 11.00, respectively.

(c) Preparation of patchoulione

Forty (40) g. of trans-β-patchoulanediol, prepared in accordance with part (b) of this example, 200 ml. of benzene, and 1.5 g. of paratoluenesulfonic acid were heated under reflux for about 30–40 minutes, the apparatus being provided with a Dean-Stark water trap, permitting the distilled solvent to be returned continuously to the reaction vessel and trapping the water of reaction. A total of 3.3 ml. of water was so collected.

The reaction mixture was then washed twice, each time with 50 ml. of 10% aqueous NaOH solution. The washed product was dried with soda ash and evaporated under a water bath under a slight vacuum. A yield of 36–7 g. of crystalline patchoulione, which while slightly off-white in color, was nevertheless practically pure, as shown by infrared chromatography and oximation, was obtained. Pure white patchoulione, in 35 g. yield, was obtained by distilling the off-white product at 130°–131° C., under a pressure of 2.5 mm. of Hg. The melting point of the final product was 48.5° C.

The foregoing illustrates the practice of this invention, which, however, is not to be limited thereby, but is to be construed as broadly as permissible in view of the prior art and limited solely by the appended claims.

What is claimed is:

1. The process for making patchoulione, which comprises reacting trans-β-patchoulane-diol with a strong acid in the presence of an inert, water-immiscible solvent, under reflux, while removing the water of reaction continuously from the reaction mixture.

2. The process for making patchoulione, which comprises reacting trans-β-patchoulanediol with p-toluenesulfonic acid in the presence of an inert, water-immiscible solvent, under reflux, while removing the water of reaction continuously from the reaction mixture.

3. The process of claim 2 wherein benzene is the solvent.

References Cited in the file of this patent

UNITED STATES PATENTS

| 2,042,224 | Groll et al. | May 26, 1936 |

FOREIGN PATENTS

| 574,838 | Germany | Apr. 22, 1933 |